Figure 1:
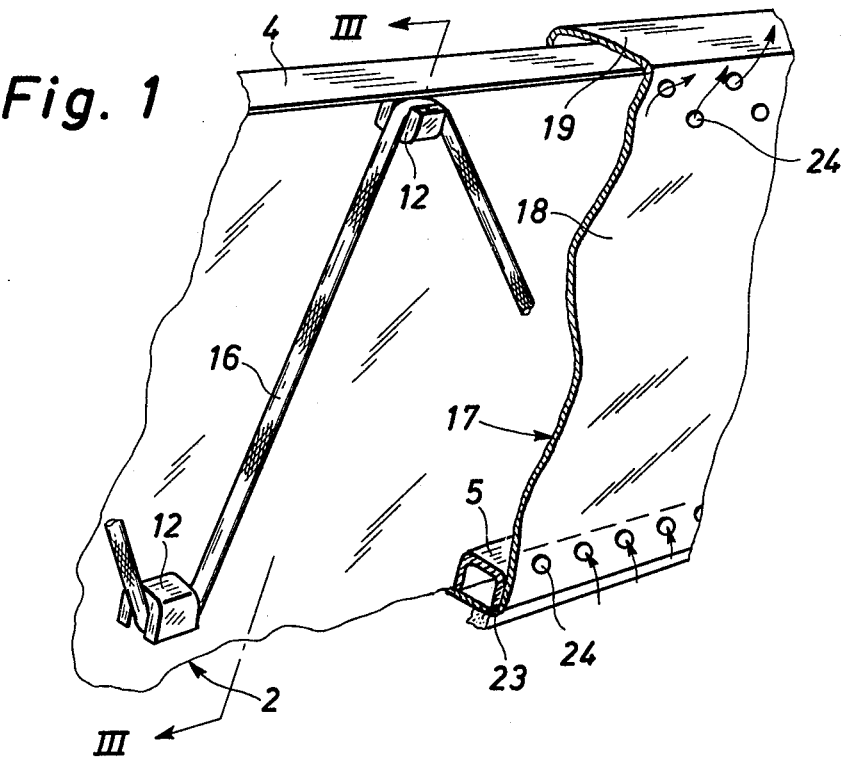

United States Patent [19]

Keldmann

[11] 4,086,468

[45] Apr. 25, 1978

[54] BASEBOARD ELECTRIC HEATING APPARATUS

[76] Inventor: Erik Christian Vilhelm Keldmann, Acasievej 5, 4490 Jerslev, Denmark

[21] Appl. No.: 596,805

[22] Filed: Jul. 17, 1975

[30] Foreign Application Priority Data

Jul. 23, 1974 Denmark .............................. 3959/74

[51] Int. Cl.² .......................... H05B 1/00; F24H 3/00; F24H 9/10; F24D 13/02
[52] U.S. Cl. ...................................... 219/377; 165/55; 219/342; 219/366; 219/374; 338/214; 338/283
[58] Field of Search ................ 219/342, 345, 366–368, 219/374–377; 165/49, 50, 53–57; 338/212, 214, 259, 286, 283

[56] References Cited

U.S. PATENT DOCUMENTS

| | | | |
|---|---|---|---|
| 562,527 | 6/1896 | Hadaway et al. ................ | 338/286 X |
| 1,474,887 | 11/1923 | Bridges ................................. | 338/214 |
| 1,664,171 | 3/1928 | Hicks .................................... | 219/377 |
| 2,460,625 | 2/1949 | Ellis ...................................... | 219/342 |
| 2,521,540 | 9/1950 | Richardson .......................... | 219/213 |
| 2,651,504 | 9/1953 | Gundrum et al. .................... | 165/55 |
| 2,709,576 | 5/1955 | Marggraf ...................... | 219/366 UX |
| 2,731,242 | 1/1956 | Borg et al. .......................... | 165/55 X |
| 2,732,479 | 1/1956 | Rowland .......................... | 338/259 X |
| 2,930,880 | 3/1960 | Thompson ...................... | 219/342 X |
| 2,993,978 | 7/1961 | Markel et al. .................... | 219/366 X |
| 3,026,393 | 3/1962 | Quirk .................................. | 165/55 X |
| 3,310,652 | 3/1967 | Williams .......................... | 219/366 X |

FOREIGN PATENT DOCUMENTS

| | | | |
|---|---|---|---|
| 237,681 | 2/1962 | Australia .............................. | 219/366 |
| 1,487,032 | 5/1967 | France ................................. | 219/366 |
| 1,916,551 | 10/1970 | Germany ............................. | 219/367 |
| 404,784 | 1/1934 | United Kingdom ................ | 219/342 |
| 516,258 | 12/1939 | United Kingdom ................ | 219/342 |
| 898,512 | 6/1962 | United Kingdom ................ | 219/342 |
| 1,155,383 | 6/1969 | United Kingdom ................ | 219/342 |

*Primary Examiner*—A. Bartis
*Attorney, Agent, or Firm*—Holman & Stern

[57] ABSTRACT

An electric space heating apparatus consisting of a plurality of sections having box-like portions which by means of middle pieces are interconnected in such a way that the apparatus can extend along all the walls of the room and the zig-zag electric heating elements in the apparatus sections can be fed continuously through the complete apparatus, the apparatus being adapted to deliver the heat to the space by approximately 65–75 per cent radiation and approximately 25–35 per cent convection to circulating air, said apparatus can be easily mounted by persons without special education and authorization.

1 Claim, 11 Drawing Figures

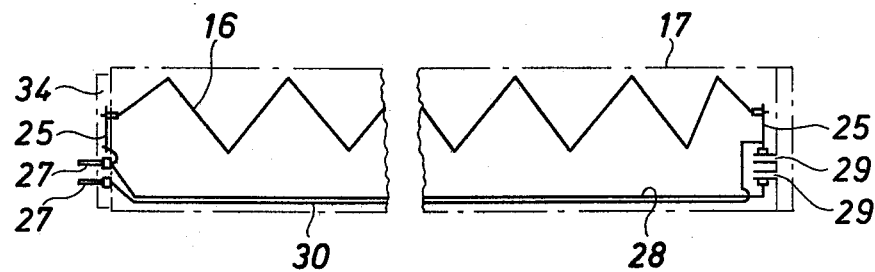
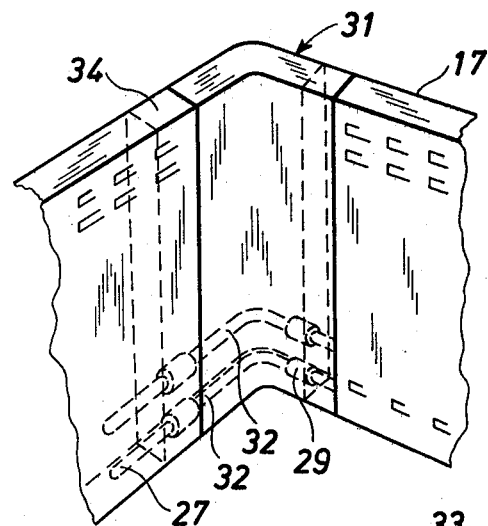
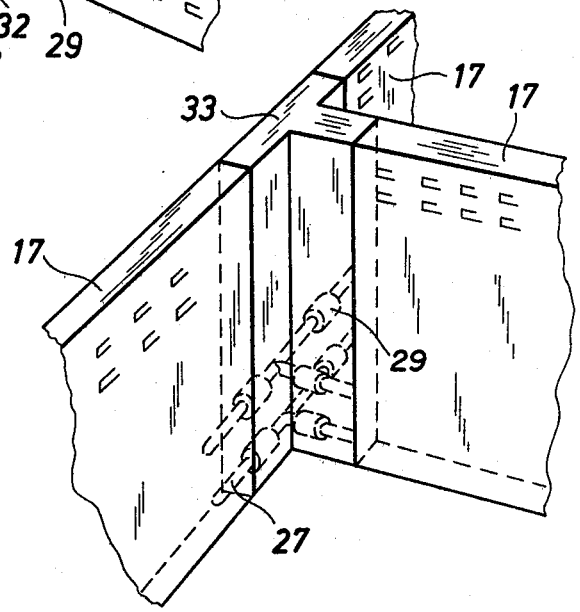

BASEBOARD ELECTRIC HEATING APPARATUS

The invention deals with a heating apparatus of the type which is adapted to be mounted at the floor along the wall in a room which is to be heated and to constitute a baseboard, the apparatus having a box-shaped housing in which one or more heating elements is mounted and from which the heat is delivered to the space, partly by radiation and partly by convection via circulating air.

All previously known heating systems for space heating are in reality based on the same idea as the oldest way of space heating, viz. using a furnace which is arranged at a suitable place in the room. All heating apparatuses, especially radiators, which have later on been developed, function in such a way that the heat to the space comes from one of the walls in the room or generally from a part of this wally only, and the other portions of the space receive heat from the heating soure via circulating air, which results in large variations of temperature in the room.

It is known to construct radiators as baseboards, but known radiators of this type extend only along one of the walls in the room and are generally only active in a limited portion of their length, so than such radiators in reality function as other conventional radiators.

Scientific information collection and analysis of man's physiological and psychological relations to space heating have shown that a person obtains the optimal comfort if the heat delivered from outside comes from all sides, so that the person so to say is "heat surrounded", and further that the temperature is substantially the same at the feet as at head-height. If the person moves about in the room, it is further a condition for obtaining optimal comfort that the temperature is substantially the same all over the room.

It has been proved that a person feels very comfortable at a temperature of 21° C if this temperature prevails at the whole surface of the person. All previously known space heating systems give a temperature difference between the head and the feet of about 4° C, and this difference is perceived by the person as "a cold floor", and further the said temperature difference creates movements of the air in the room which are perceived as draught. In order to avoid these inconveniences by known heating systems the temperature is increased, but this leads to high temperatures at the ceiling, which results in decreased comfort and economy.

A primary object of this invention is to provide a completely new heating system which is able to provide the said "heat surrounding" of a person staying in the room and to provide an apparatus for this purpose which is economical in manufacture and use.

The apparatus according to the invention is characterised in that it is constructed of a plurality of sections each containing a heating element, said sections being adapted to be interconnected by means of middle pieces in such a way that they can surround the space to be heated, and the heating elements can be fed continuously through the complete apparatus, the apparatus being so constructed that approximately 65–75 percent of the heat is delivered by radiation and approximately 25–35 percent of the heat is delivered by convection.

By such an apparatus the heat will radiate towards the central portion of the space from all sides, so that a "radiation heat carpet" is constituted over the whole floor surface, whereas only a relatively little convection takes place along all the wall surfaces of the room at a low speed of the air moving against the ceiling, e.g. less than 10 cm per second.

It has been proved that by such a heating apparatus it is possible to keep a substantially equal temperature at all spots in the space, in horizontal direction as well as in vertical direction, whereby optimal comfort and economy are obtained.

As the relative moisture content in a space is a function of the temperature the heating system according to the invention provides a moisture content in the air in the space which makes it superfluous to use special arrangements for increasing the moisture content.

As the heating apparatus according to the invention is built up of a plurality of sections and middle pieces it can be manufactured as a module system consisting of standard elements which can be used for any kind of room, so that the manufacture as well as the mounting of the heating system can be relatively cheap.

The climate in a room which is heated by an apparatus according to the invention gives a hitherto unknown comfort which is not only pleasant, but also healthy. The reason for this is that the temperature at ankle height is optimal, e.g. 21° C, and this is very seldom the case in rooms heated by known heating systems, but it is an absolute condition of comfort, as the heat feeling at ankle height is decisive for the total heat feeling of a person. At the same time a temperature at head-height of 21° C will be perceived as comfortable, and also here the new heating system is different from known heating systems by which the temperature at head-height generally is considerably higher than the most comfortable temperature.

According to the invention the apparatus sections can be constructed in such a way that conduits mounted therein are connected to coupling means in both ends of the section, such as plugs and sleeves in case of an electric heating element, so that the apparatus can be easily constructed by interconnecting suitable sections and middle pieces. By using the same type of connection between the apparatus and the domestic supply in the same way as connecting loose lamps etc. the apparatus can be installed by persons who are not educated or authorized.

Further inventive features and advantages will appear from the following technical description of some embodiments of a heating apparatus according to the invention.

The invention will now be described in greater detail with reference to the accompanying drawings, in which FIG. 1 in isometric view shows a heating apparatus partly sectioned, FIG. 2 a diagram illustrating the heating system according to the invention, FIG. 3 a section taken along line III—III of FIG. 1 through an apparatus mounted on a wall near the foor, FIG. 4 an isometric view of an eye member, FIG. 5 an end view of the eye member, FIG. 6 an isometric view of an apparatus section, FIG. 7 a diagram showing the conduits and connections in the apparatus section, FIG. 8 an angular middle piece, FIG. 9 a T-shaped middle piece, FIG. 10 a middle piece constructed as electric socket, and FIG. 11 a diagram for the conduits and connections in the middle piece shown in FIG. 10.

Figure 6:
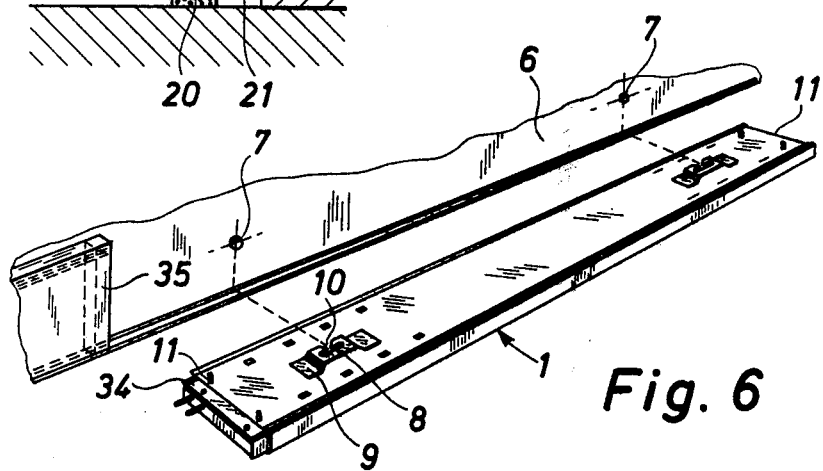

In FIG. 6 is shown an apparatus section denoted as a whole by 1 and consisting of a box-shaped housing which can be constructed of steel plate and containing a heating element which may be an electric resistance cable. FIGS. 1 and 3 show the construction of the apparatus section.

The apparatus section consists of an inner part 2 having a plane main portion 3 which in mounted position is vertical and at the top has a bent flange portion 4 and at the bottom another bent flange portion 5. As will appear from FIG. 3, the inner part 2 is mounted on a room wall 6 by means of screws 7 the heads of which are received in slots 8, FIG. 6, in mounting members 9 which are welded to the rear side of the main portion 3 and has a transverse slot 10 connecting the slot 8 with the edge of the mounting member 9 for introduction of the screw 7. On the rear side of the main portion 3 four pins 11 are mounted, and they abut the wall 6 and constitute thereby distance means keeping the inner part 2 in a predetermined position. If the screws 7 are tensioned in such a way that a certain stress is introduced into the plate member 9, the inner part will be firmly mounted on the wall 6.

Figure 4:
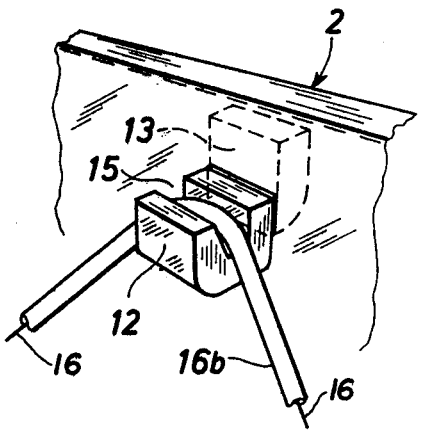
Figure 5:
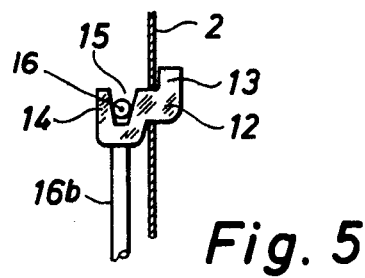

In the main portion 3 some slots are provided in which eye members 12 as shown in FIGS. 4 and 5 are mounted, the members 12 having a profile substantially like a Z of which the one outer portion 13 is introduced through the slot in the main portion 3 and in mounted position is arranged at the rear side of the portion 3, whereas the middle portion of the eye member 12 is arranged in the slot. The front portion 14 of the eye member 12 is arranged in fromt of the plate 3 and has a groove 15 in which an electric resistance heating element is mounted. The heating element 16 extends in a zigzag manner, i.e. an extended way longitudinally of the inner part 2 in such a manner as will be explained later on.

The apparatus section has further an outer part 17 having a plane main portion 18 with an upper flange portion 19 extending above the flange portion 4 and a bottom flange portion 20 which has a bent portion 21 engaging the flange portion 5 on the inner part 2. The flange portion 19 has an extension 22 which partly abuts the wall 6 and partly the main portion 3 of the inner part 2. Hence the flange portion 22 closes the gap between the apparatus section and the wall 6. The inner part 2 and the outer part 17 are interconnected alone by snap action to constitute a closed, box-shaped housing. Below the flange portion 20 an elongated member 23 of suitable material can be arranged for closing of the gap between the underside of the apparatus and the floor.

The main portion 18 of the outer part 17 has at the top and at the bottom rows of air circulation holes 24.

FIG. 7 it is shown how the conduits may be arranged in an apparatus section according to the invention having a heating element of electric resistance cables. The heating element 16 consists of a resistance cable which in each end is connected to a connecting rail 25 and extends in zigzag shape through the complete length of the apparatus section. The heating conduit can be constructed of an electric resistance cable which can possibly be wound as a helical line and which is surrounded by a mantle 16b of an insulating material, e.g. a glass material which is flexible, but substantially non-stretchable.

The connection rail 25 in the left side of FIG. 1 is connected to a plug 27 which through a conduit 28 extending rectilinearly through the apparatus section is connected to a sleeve 29 in the other end of the apparatus section. A corresponding sleeve 29 is connected to the connecting rail 25 to the right in FIG. 7 and further through a conduit 30 to another plug 27 in the left end of FIG. 7. The plugs 27 and the sleeves 29 are so shaped and arranged that two plugs on one apparatus section can be inserted in two sleeves in another similar apparatus section, so that any desired number of apparatus sections can be interconnected to provied a continuous apparatus. If the plugs 27 are connected by an electric conduit to a socket in the domestic supply the electric current will pass the heating element 16 and the conduit 30, so that the apparatus section can function as an independent radiator.

By mounting or more apparatus sections in a row the conduits 28 and 30 will act as feed cables for the heat elements 16 in the following apparatus sections, so that the said following apparatus sections will be fed with current in parallel with the heating element in the first section. Hence, it is possible to connect any desired number of apparatus sections, as all the heating elements will be fed through the interconnected conduits 28 and 30 in all the sections.

In order to be able to mount apparatus sections along all the walls in a room special middle pieces are provided, such as angle pieces 31 shown in FIG. 8. This middle piece consists of an angular box unit having plugs 27 in one end and sleeves 29 in the other end, so that the two ends can be connected to the ends of apparatus sections according to FIG. 7. The plugs and the sleeves are connected with cables 32 in the middle piece.

If it is desired to connect three apparatus sections with each other, so that two of the sections are aligned and the third is arranged perpendicularly on the two others, a T-shaped middle piece 33 as shown in FIG. 9 is used. This middle piece consists of a T-shaped housing the three ends of which are shaped in the same way as the ends of the apparatus sections, so that plugs and sleeves corresponding to the plugs and sleeves on the apparatus section are provided, and the plugs and sleeves are interconnected by means of cables in the T-shaped housing. Such a T-shaped middle piece may e.g. be used if a partition is provided in a room which is to be heated by an apparatus according to the invention. If the partition is removed, the T-shaped middle piece can also be removed and a rectilinear middle piece substituted.

In each end of the apparatus section a projection 34 can be provided as shown in FIG. 6, the projection being adapted to be inserted in a corresponding recess 35 in the end of another apparatus section, so that a unit having a smooth surface is constituted. In the same way the middle pieces 31 and 33 can be provided with corresponding extensions and recesses, so that the apparatus also here will have smooth surfaces.

Figure 2:
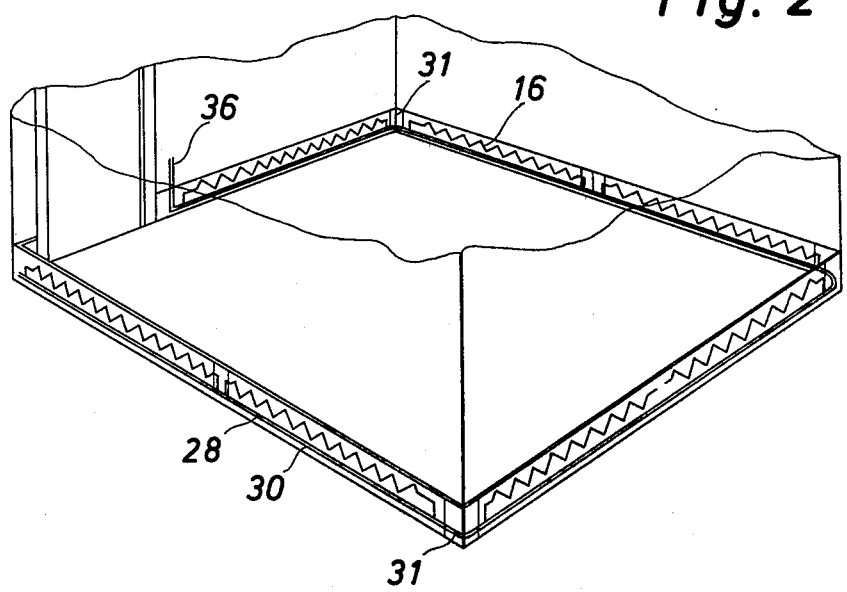

In FIG. 2 it is diagrammatically illustrated how a plurality of apparatus sections are interconnected by means of middle pieces 31 for constructing a continuous baseboard radiator which extends along all the four walls of the room and is only interrupted by possible doorways. The cables 36 connect the parallelly coupled heating elements to the domestic supply through a socket. Zigzag-shaped heating elements 16 extend through all the apparatus sections and are fed by means of the cable 28 and 30 extending continuously through the complete apparatus.

The apparatus sections may be provided with heating elements having different effect, so that it is possible to obtain different heat delivery at the walls of the room. Hence, it is possible to mount apparatus sections at outer walls having greater effect than the apparatus sections arranged at the inner walls.

Figure 3:
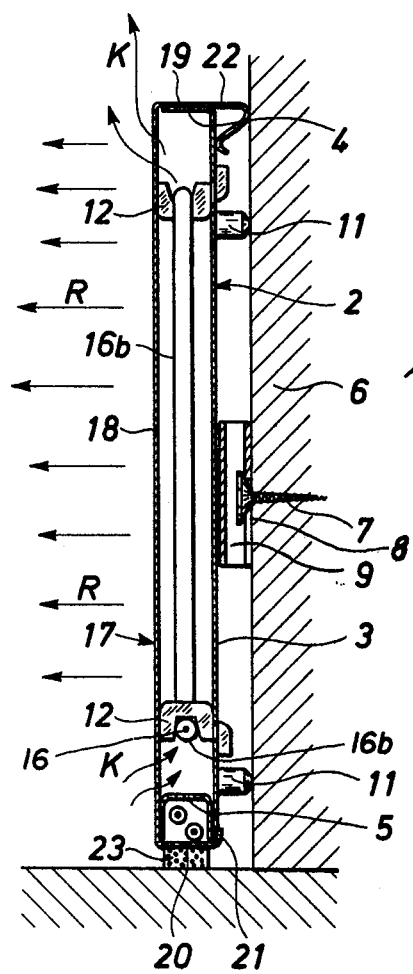

As will appear from FIG. 3, the apparatus delivers heat by radiating substantially in horizontal direction, as illustrated by the arrows R, and delivers heat by convection to circulating air, as shown by the arrows K. The apparatus is constructed in such a way that only about 25-35 percent of the heat delivery is convection.

Figure 10:
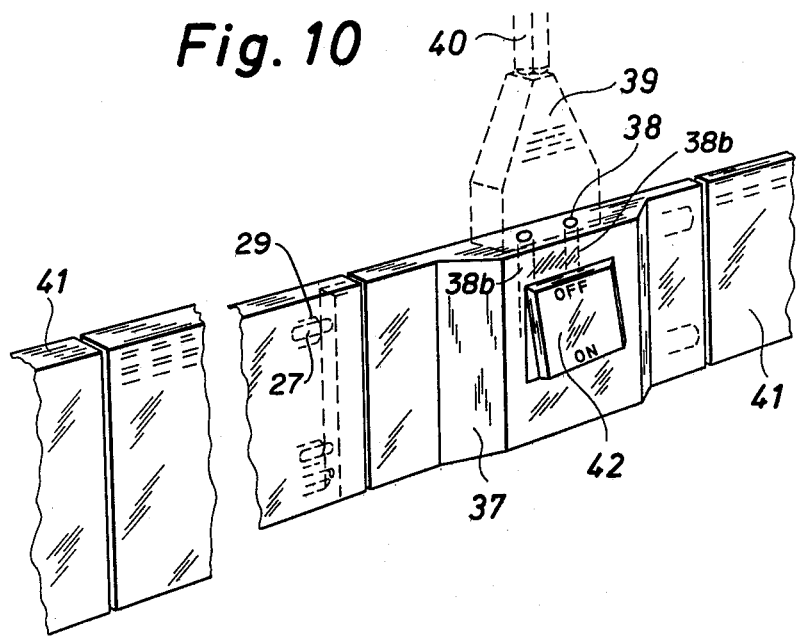
Figure 11:
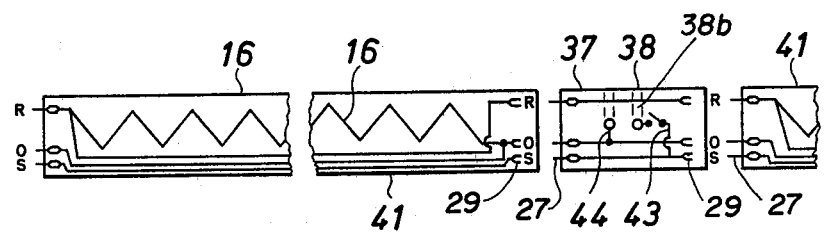

FIGS. 10 and 11 show a middle piece 37 which at the top has apertures 38 and not shown sleeves in which the plugs on a standard male plug member 39 on a cable 40 can be inserted. The middle piece 37 has in its ends plugs and sleeves, so that it can be electrically connected to two apparatus sections 41. The middle piece 37 further carries a switch 42 which can be activated from the outside of the middle piece and close and open the connection to the middle piece. On FIG. 11 is shown an apparatus section 41 which in one end has three plugs R, O, and S and in the other end three sleeves, R, O, and S. R and S are phase wires which are connected to the phases in a three-phase domestic supply, whereas O is the neutral wire which is connected to the zero phase.

As can be seen an electric heating element 16 is connected at one end to the wire R and at the other end to the neutral wire. the switch 42, the second pole of the switch is connected to the aperture 38, and the second aperture 38 is connected with the neutral wire through a wire 44, through sleeves 38b.

By the arrangement shown in FIG. 11 it will be possible to regulate the effect of the heating elements, e.g. by automatical thermostat control without influencing the normal current delivery from the sleeves 38 to the consumption wire 40 which may lead to a lamp, a radio or the like.

I claim:

1. A baseboard electric heating apparatus of the type which is adapted to be mounted at the floor along the walls in a room which is to be heated and to constitute a baseboard along the walls of the room, said apparatus including a plurality of elongated apparatus sections, each apparatus section comprising a box-shaped housing in which an electric heating element is mounted, each apparatus section having air inlet and air outlet openings for the flow of air therethrough by convection and the exposed outer surface of each apparatus section defining a heat radiating surface whereby heat from the heating element can be delivered to the room partly by radiation from the exposed surface and partly by convection via air circulating through the apparatus section, said plurality of apparatus sections being interconnected end-to-end and being mounted at the floor as a baseboard along all of the walls of the room to be heated whereby the heating apparatus surrounds the space to be heated, connecting means interconnecting said heating elements of the respective sections in such a way that power can be fed to the heating elements from one end of the interconnected array of apparatus sections, said plurality of apparatus sections so constructed that approximately 65-75 percent of the heat therefrom is delivered by radiation and approximately 25-35 percent is delivered by convection, said individual apparatus sections comprising a rectangular inner part having a plane, in mounted position vertical, main portion and an upper and lower flange portion projecting away from the wall in the room, said inner part carrying eye-like members for supporting said heating element in said housing and supporting and distance members which are adapted to mount the main portion at a predetermined distance from the wall of the room and to engage mounting means on the wall of the room, and further, an outer part consisting of a plane main portion of the same shape as the main portion of the inner part and having upper and lower flange portions projecting towards the main portion of said inner part and which extend over and under the flange portion of the inner part, respectively, and have bent rim portions engaging the rear side of the inner part, at the top and the bottom of the main portion of the outer part, horizontal rows of air holes being provided to form said air inlet and air outlet openings.

* * * * *